United States Patent
Tavares Miranda

(10) Patent No.: US 12,017,732 B2
(45) Date of Patent: Jun. 25, 2024

(54) DRIVE CHAIN SYSTEM

(71) Applicant: MIRANDA & IRMAO, LDA, Agueda (PT)

(72) Inventor: Joao Filipe Tavares Miranda, Agueda (PT)

(73) Assignee: MIRANDA & IRMAO, LDA, Agueda (PT)

( * ) Notice: Subject to any disclaimer, the term of this patent is extended or adjusted under 35 U.S.C. 154(b) by 258 days.

(21) Appl. No.: 17/602,263

(22) PCT Filed: Dec. 19, 2019

(86) PCT No.: PCT/EP2019/086475
§ 371 (c)(1),
(2) Date: Oct. 7, 2021

(87) PCT Pub. No.: WO2020/192957
PCT Pub. Date: Oct. 1, 2020

(65) Prior Publication Data
US 2022/0161893 A1    May 26, 2022

(30) Foreign Application Priority Data

Mar. 27, 2019 (EP) .................................... 19165632
Apr. 8, 2019 (EP) .................................... 19167948

(51) Int. Cl.
*B62M 9/124* (2010.01)
*F16G 13/02* (2006.01)

(52) U.S. Cl.
CPC ............ *B62M 9/124* (2013.01); *F16G 13/02* (2013.01)

(58) Field of Classification Search
CPC ............ F16H 7/06; B62M 9/124; F16G 12/02
(Continued)

(56) References Cited

U.S. PATENT DOCUMENTS 3,772,932 A    11/1973 Nagano
4,268,259 A     5/1981 Segawa et al.
(Continued)

FOREIGN PATENT DOCUMENTS

CN    2120219 U    10/1992
CN    1091373 A     8/1994
(Continued)

OTHER PUBLICATIONS

Office Action for Corresponding EP Application No. 19167948.9, 5 Pages, dated Jan. 7, 2022.
(Continued)

*Primary Examiner* — Henry Y Liu
(74) *Attorney, Agent, or Firm* — LUCAS & MERCANTI, LLP

(57) ABSTRACT

A drive chain system having a chain with an alternating succession of inner chain links and outer chain links, each inner chain link having a pair of inner link plates and each outer chain link having a pair of two outer link plates contacting the inner link plates of adjacent inner chain links. A pin connects two outer link plates and two inner link plates, wherein the inner surfaces of a pair of opposite outer link plates has protrusions in the area between the adjacent inner link plates. The system has a rear cassette with a multitude of sprockets with a plurality of sprocket teeth, wherein the cassette has sprocket teeth of different tooth types, the teeth of at least one tooth type having a tip laterally offset from the centerplane.

15 Claims, 17 Drawing Sheets

(58) Field of Classification Search
USPC .......................................................... 474/160
See application file for complete search history.

(56) References Cited

U.S. PATENT DOCUMENTS

| | | | | |
|---|---|---|---|---|
| 5,203,745 | A * | 4/1993 | Wang | ...................... F16G 13/06 474/213 |
| 5,322,482 | A * | 6/1994 | Wang | ...................... F16G 13/06 474/206 |
| 5,322,483 | A * | 6/1994 | Wang | ...................... F16G 13/06 474/212 |
| 5,458,543 | A | 10/1995 | Kobayashi | |
| 8,066,604 | B2 * | 11/2011 | Righi | ...................... F16G 13/06 474/228 |
| 9,939,045 | B2 * | 4/2018 | Fukumori | ................ F16G 13/06 |
| 10,125,846 | B2 * | 11/2018 | Fukumori | ................ F16G 13/06 |
| 11,174,915 | B2 * | 11/2021 | Dos Santos | ............ F16G 13/06 |
| 11,525,495 | B2 * | 12/2022 | Hebbecker | ............ F16G 13/02 |
| 11,624,423 | B2 * | 4/2023 | Wu | ........................... F16H 7/06 474/231 |
| 2005/0079940 | A1 | 4/2005 | Reiter | |
| 2007/0243963 | A1 * | 10/2007 | Righi | ...................... F16G 13/06 474/219 |
| 2011/0092327 | A1 * | 4/2011 | Oishi | ..................... B62M 9/10 474/160 |
| 2016/0207590 | A1 * | 7/2016 | Fukumori | ................ B62M 9/10 |
| 2017/0067535 | A1 * | 3/2017 | Fukumori | ................ F16G 13/06 |
| 2017/0247081 | A1 | 8/2017 | Sugimoto | |
| 2018/0017131 | A1 * | 1/2018 | Fukumori | ................ F16G 13/06 |
| 2018/0073621 | A1 * | 3/2018 | Fukunaga | ................ B62M 9/10 |
| 2018/0112764 | A1 | 4/2018 | Sugimoto | |
| 2018/0127057 | A1 | 5/2018 | Sugimoto | |
| 2018/0178882 | A1 * | 6/2018 | Vonend | ..................... B62M 9/10 |
| 2018/0201341 | A1 * | 7/2018 | Wu | ........................ F16H 9/24 |
| 2019/0346020 | A1 * | 11/2019 | Dos Santos | ............. F16G 13/06 |

FOREIGN PATENT DOCUMENTS

| | | |
|---|---|---|
| CN | 107963176 A | 4/2018 |
| CN | 108068972 A | 5/2018 |
| EP | 1188658 A2 | 3/2002 |
| EP | 3406932 A1 | 11/2018 |
| FR | 2637034 A1 | 3/1990 |
| JP | S5279655 U | 6/1977 |
| TW | 201825351 A | 7/2018 |

OTHER PUBLICATIONS

Office Action for Corresponding European Patent Application No. 19167948.9, 5 pages, dated Nov. 9, 2022.
Office Action for Corresponding Chinese Patent Application No. 201980096692.5, 5 pages, dated Oct. 14, 2022, English translation 3 pages.
International Search Report and Written Opinion for corresponding International Application No. PCT/EP2019/086475 dated May 26, 2020 (9 Pages).
Extended European Search Report for Application No. 19167948.9 dated Sep. 24, 2019.
Bikerumor; Taya EVO-Light celebrates 50 years making chains by eliminating the roller; Posted by Cory Benson, Apr. 3, 2019, 19 pages.

* cited by examiner

DRIVE CHAIN SYSTEM

CROSS REFERENCE TO RELATED APPLICATION

This Application is a 371 of PCT/EP2019/086475 filed on Dec. 19, 2019, which in turn claims the benefit of European Application No. 19165632.1 filed on Mar. 27, 2019 and European Application No. 19167948.9 filed on Apr. 8, 2019, all of which are incorporated herein by reference.

TECHNICAL FIELD

This application relates to a drive chain system, in particular a drive chain system for a bicycle, comprising a chain with an alternating succession of inner chain links and outer chain links as defined by the preamble of claim 1. This application further relates to a bicycle comprising a drive chain sys-tem. In this regard, the term bicycles particularly includes conventional bicycles driven only by cranks and bicycles driven by a combination of cranks and an electric engine, typically called pedelecs or ebikes.

BACKGROUND ART

Drive chain systems comprising chains with an alternating succession of inner links and outer links are well known in the prior art. One characteristic of such chains is that the distance between opposite outer link plates is much larger than the distance between opposite inner link plates, since the outer link plates are arranged at the outer surfaces of the inner link plates.

CN 2120219 U discloses a drive chain system, wherein the inner and outer chain links of the chain comprise protrusions in the area between the adjacent link plates.

The protrusions comprise a curved surface in order to provide a smoother movement and better guidance of the chain engaging the chainring teeth of the chainrings and/or the sprocket teeth of the rear cassette's sprockets. Nevertheless, there is a possibility that the sprocket teeth engaging the chain have to move into a comparable small gap between the link plates when engaging the chain links. Said gap is just minimally wider than the width of the sprocket teeth. Therefore, the protrusions are insufficient to provide a smooth engagement between chain links and sprocket teeth. This problem occurs especially during shifting operations. The benefit of good guidance of the chain is therefore often compensated by problems occurring during shifting between sprockets of the rear cassette.

DISCLOSURE OF INVENTION

It is an object of the invention to provide a drive chain system with a chain with inner chain links and outer chain links that provides a smooth engagement between chain and sprocket, in particular improved shifting behavior.

The object is attained by the combination of features of the independent claims. The dependent claims provide preferred embodiments of the drive chain system described herein.

The drive chain system can comprise a chainring with a plurality of chainring teeth and a chain. The chainring is moved by the cranks and/or the electric motor of the bicycle and transmits the motion to the chain. The chain drives the rear wheel of the bicycle via a rear sprocket. The rear sprocket is part of a rear cassette comprising a multitude of sprockets.

The cassette comprises sprocket teeth of different sprocket tooth types, the teeth of at least one sprocket tooth type having a tip laterally offset from the centerplane. The lateral offset of the tip can improve the ability of the sprocket tooth to engage the chain during a shifting motion. Unfortunately, a sprocket tooth laterally offset into one lateral direction will improve shifting either up or down, but has a negative effect on the shifting operations in the other direction. However, it has been found that if there are teeth of different types which, considered individually, only have a positive effect on switching operations in one direction or the other, the total improvement in switching operations in both directions can be achieved by mixing different types of teeth.

At least one sprocket tooth type can be an upshifting sprocket tooth type supporting shifting to a larger sprocket, the upshifting sprocket teeth of this upshifting sprocket tooth type having a tip laterally offset towards a smaller sprocket. "Laterally offset" particularly means laterally offset relative to the centerplane of the respective sprocket tooth. The centerplane of the sprocket tooth of a sprocket is the plane which extends parallel to the radial extension of the sprocket and is located in the centre of the respective sprocket tooth in a lateral direction, i.e. in a direction orthogonal to the centerplane. It has been found that with these upshifting sprocket teeth, the tip offset towards the smaller sprocket comes into contact more easily with a chain link moved from the rear derailleur to the larger sprocket during the shifting process. In combination with the protrusions on the outer links, there is also the advantage that the laterally offset tip can engage the protrusion after initial contact with the chain link to move the chain further in lateral towards the larger sprocket.

The cassette particularly comprises teeth of at least two different upshifting sprocket tooth types supporting shifting to a larger sprocket, wherein the distance by which the tips of the at least two upshifting sprocket tooth types are offset towards the smaller sprocket—relative to the respective centerplane—being different between the at least two upshifting sprocket tooth types. By combining these two upshifting sprocket tooth types, an even more pronounced positive influence on the shifting process in the direction of the larger sprocket can be achieved.

The upshifting sprocket teeth of at least one upshifting sprocket tooth type may have on their side facing a smaller sprocket a taper of the tooth towards the tip. It has been found that such taper of the tooth simplifies the sliding of the tooth between the projections of the chain link.

The taper is in particular at an angle ($\alpha$) of at least 5°, preferably at least 10°, and/or maximum 45°, preferably maximum 12°, to a plane parallel to the centerplane of the respective tooth. It has been found that in these angular ranges a particularly good compromise is achieved between facilitating the insertion of the upshifting sprocket tooth between the projections and lateral guidance of the chain link through the upshifting sprocket tooth.

The teeth of at least one upshifting sprocket tooth type may have an inclined surface between their side facing a larger sprocket and the tip. Such an inclined surface may, in particular during the shifting operation to a larger sprocket, enable the chain link gripped by the upshifting sprocket tooth to slide in a controlled manner in the direction of its lateral target position on the larger sprocket due to its contact with the projection of a chain link, before the chain link fully engages the upshifting sprocket tooth.

The inclined surface is in particular at an angle ($\beta$) of at least 100°, preferably at least 120°, and/or maximum 170°, preferably maximum 140°, to a plane parallel to the centerplane of the respective tooth. It turned out that inclined surfaces at these angles in combination with the protrusions of the chain links lead to smooth shifting operation and a significant reduction of noise during shifting.

At least one sprocket tooth type may be a downshifting sprocket tooth type supporting shifting to a smaller sprocket, the downshifting sprocket teeth of this downshifting sprocket tooth type having a tip laterally offset towards a larger sprocket. "Laterally offset" particularly means laterally offset relative to the centerplane of the respective sprocket tooth. The centerplane of the sprocket tooth of a sprocket is the plane which extends parallel to the radial extension of the sprocket and is located in the centre of the respective sprocket tooth in a lateral direction, i.e. in a direction orthogonal to the centerplane. It has been shown that with these downshifting sprocket teeth, the tip offset towards the larger sprocket comes into contact more easily with a chain link moved from the rear derailleur to the smaller sprocket during the shifting process. In combination with the protrusions on the outer links, there is also the advantage that the laterally offset tip can engage the protrusion after initial contact with the chain link to move the chain further in lateral direction towards the smaller sprocket.

The downshifting sprocket teeth of the downshifting sprocket tooth type may have a facet on their side facing a smaller sprocket. The facet may extend between the tip and the leading tooth flank. Such a facet may, in particular during the shifting operation to a smaller sprocket, enable the downshifting sprocket tooth to slide in a controlled manner beside a chain link and guide the chain link direction of its lateral target position on the smaller sprocket.

Nevertheless, it is possible that at least one sprocket tooth type is a neutral sprocket tooth type having no laterally offset tip.

The chainring teeth and/or the sprocket teeth may show generally identical width in the transverse direction and engage alternately with inner chain links and outer chain links. The chain comprises an alternating succession of inner chain links and outer chain links, each inner chain link having a pair of inner link plates. The inner link plates may be contacting the lateral faces of two rollers. Each of the outer chain links has a pair of two outer link plates contacting the inner link plates of adjacent inner chain links. Two outer link plates and two inner link plates and in particular a roller are connected by a pin. The inner surfaces of a pair of opposite outer link plates comprise protrusions in the area between the adjacent inner link plates. The chain may comprise rollers between the inner link plates, alternatively the inner link plates of an inner chain link can be spaced away from each other by other means, for example by protruding zones around the inner links eyes and/or thickened parts of the pins and/or of the inner links.

The protrusions extending from the inner surfaces of outer link plates reduce the distance between these inner surfaces of outer link plates, so that the lateral clearance between the chainring teeth of a chainring and/or the sprocket teeth of a sprocket engaging with outer links of the chain is reduced. The chain described herein improves the guidance of the chainring teeth and/or the sprocket teeth between the outer chain link plates on the chainring because it reduces the distance between the inner surfaces and thus the clearance of play between these surfaces and the engaging chainring teeth and/or sprocket teeth. The reduced clearance between chainring teeth and/or sprocket teeth engaging between pairs of outer link plates also reduces noise, which usually occurs due to lateral movement of the chain hitting the chainring teeth and/or the sprocket teeth.

The chainring and/or the sprocket can have an even number of chainring teeth and/or sprocket teeth or an odd number of chainring teeth and/or sprocket teeth.

The chainring teeth can taper laterally towards their respective tip. Therefore, the tips with the reduced thickness can slip into the space between the link plates, and especially the space between the protrusions, more easily than chainring teeth with a constant width. Once introduced into the space between the protrusions, the width of the part of the chainring tooth placed between the protrusions increases while the respective chain link moves into its fully-engaged position on the chainring. During this movement, the clearance between the protrusions and the chainring tooth decreases and the chain is guided by the chainring tooth in lateral direction allowing the next chainring tooth to engage the gap between the next pair of link plates.

The chainring teeth can comprise a lateral curvature. A lateral curvature allows the tapering of the chainring teeth with a variation of the gradient of the decrease of the chainring teeth width towards the tip of the respective chainring tooth. In praxis, the modulus of the gradient can increase in the direction towards the tip. This allows to provide a rapid increase of lateral guidance of the chain by a respective chainring tooth, shortly after the tip of the chainring tooth has entered the space between the protrusions.

The lateral curvature can have a convex radius of at least 8 mm, particularly at least 10 mm, and/or maximum 14 mm, particularly maximum 12 mm. Theses values are appropriate to achieve a good lateral guidance of the chain immediately after the tip of a respective chainring tooth entering the space between the protrusions.

It is possible that the chainring teeth taper laterally in a section between their respective tip and a section of the respective chainring tooth with parallel lateral surfaces. In this case, the chainring teeth can taper towards their tips in a limited region near the tips and therefore provide a fast increase in lateral guidance of the chain when the tapering region passes the space between the protrusions.

In praxis, the distance between the lateral surfaces of the chainring teeth can be at least 1.9 mm and/or maximum 2 mm in the section of the respective chainring tooth with parallel lateral surfaces.

The drive chain system can be configured in such manner that the protrusions engage a chainring tooth in its section with parallel lateral surfaces, when the chain is fully engaged to this chainring tooth. In this configuration, the chainring tooth provides maximum lateral guidance to the chain when the chain is fully engaged with this chainring tooth.

The section with parallel lateral surfaces may extend by at least 0.5 mm, preferably at least 0.8 mm, towards the tip of the chainring tooth from the point of contact between the protrusion and the chainring tooth nearest to the tip of the chainring tooth, when the chain is fully engaged to this chainring tooth. In this case, the maximum lateral guidance of the chain provided by the chainring tooth is reached even before the chain is fully engaged with this chainring tooth.

The distance the protrusion protrudes from the link plate towards a chainring tooth can be at least 70%, preferably at least 90%, and/or maximum 130%, preferably maximum 110% of the distance the parallel lateral surfaces extend towards the tip of the chainring tooth from the point of contact between the protrusion and the chainring tooth nearest to the tip of the chainring tooth, when the chain is fully engaged to this chainring tooth. It turned out that these relations are advantageous regarding the lateral guidance of the chain.

The tips of the chainring teeth can protrude from the chain links when the respective chain link is fully engaged with the respective chainring tooth. This allows an engagement between chainring tooth and chain that hinders the chain from jumping of the chain ring if there is an intense movement of the chain, e.g. when the bicycle is used in difficult terrain with high velocities, for example for downhill mountain biking or the like. Preferably, the tips can protrude at least 1.8 mm, preferably at least 2.2 mm from the edge of the respective chain link at its At its narrowest point in height direction.

The circumference and/or diameter of the protrusion can be at least 60% and/or maximum 140% the circumference and/or diameter of the eyes of the outer link plate.

Preferably, the circumference and/or diameter of the protrusion is at least 90% and/or maximum 110% of the circumference and/or diameter of the eyes of the outer link plate. It turned out that these measures significantly improve the guidance of the chain on a rear cassette or sprocket.

In praxis, the diameter of the eyes of the outer chain link may be at least 3 mm, preferably at least 3.4 mm, and/or maximum 4 mm, preferably maximum 3.6 mm.

The diameter of the protrusion is at least 3.3 mm, preferably at least 3.5 mm, and/or maximum 3.9 mm, preferably maximum 3.7 mm. This sizes lead to a good guidance.

The protrusions can define a generally flat or rounded inner guiding surface. The area of the inner guiding surface may be at least 0.9 $mm^2$, preferably at least 1.1 $mm^2$, and/or maximum 1.5 $mm^2$, preferably maximum 1.3 $mm^2$. Such an inner guiding surface reduces friction between the chainring teeth and/or the sprocket teeth and the protrusion.

In Praxis, the smallest distance between the protrusion and the edge of the outer link plate is at least 0.4 mm, preferably at least 0.6 mm, and/or maximum 0.8 mm, preferably maximum 0.7 mm. This allows a combination of a smooth engagement between chainring tooth and/or sprocket tooth and chain link with a good lateral guidance of the chain link immediately after engagement with the respective chainring tooth and/or the respective sprocket tooth.

In one embodiment the thickness of the protrusions corresponds to at least 25% of the thickness of the inner link plates. The thickness of the protrusions preferably is at least 70% and most preferably 100% of the thickness of the inner link plates. In case of 100% of the thickness, the inner faces of the protrusions will be in the same lateral plane as the inner faces of the inner link plates so that the lateral guidance for the link plates between the outer link plates is identical to the lateral guidance between the inner link plates. Smaller thicknesses of the protrusions between 25% and 70% of the thickness of the inner link plates still provide improved guidance compared to a chain without protrusions, however not quite as tight as the thickness of 100% in which case the distance between these protrusions is generally equal to the distance between opposite surfaces of inner link plates. The protrusions may be symmetric to the longitudinal plane of the chain extending in the middle between and parallel two opposite link plates. The guidance of the chain on the chainring teeth of a chainring is equal for all chain links. A constant wear of inner and outer link plates as well as of the chainring teeth contacting the inner and outer link plates can be achieved.

The distance between two opposite protrusions may be at most 70% larger than the distance between two opposite surfaces of inner link plates. However, preferably the distance between two opposite protrusions is less than 50% larger and most preferably equal to the distance between two opposite inner surfaces of inner link plates.

In practice, the thickness of the outer link plate with the protrusion is generally constant. In this case, the protrusion on the inner surface of the outer link plate corresponds to a recess on the outer surface. The outer surface of the outer link plates may comprise a trough-like recess that produces a bulge forming the protrusion on the inner surface of the outer link plate. Consequently, the protrusion adds no further weight to the outer link plate which would otherwise be necessary if the protrusion was formed as an added surface layer.

A trough-like recess and the corresponding bulge have no sharp edges but shows smooth transitions between adjacent faces. This smooth shape reduces abrasive wear to the sprocket teeth of a sprocket or chainring teeth of a chainring engaging the chain link.

In practice, the recess and the corresponding protrusion may be punched into the material of the outer link plates. Punching is a very cheap and easy method for defining a recess on the outer surface and a corresponding bulge or protrusion on the inner surface. The punching of steel link plates generally defines smooth surfaces of the trough-like recess and the bulge with smooth transition radiuses.

The three dimensional deformation of the chain link plate created by the punched protrusions and the trough-like recesses further improve the torsional strength of the outer chain links plates. Furthermore, the punching process creates a cold deformation and a cold hardening of the material of the outer link plates further increasing their hardness and stability.

Alternatively, protrusions may be realized by applying additional material to the inner surfaces of the outer link plates. In this case, the outer surface of the outer link plates remains generally flat.

In practice, the protrusions define a generally flat or rounded inner guiding surface in order to provide for a large contact area for the chainring teeth of the chainring and/or the sprocket teeth of the sprocket and a low friction guidance of the chainring teeth and/or the sprocket teeth. The guiding surfaces serve provide good lateral guidance for the chainring tooth and/or the sprocket tooth engaging with the respective outer chain link. In particular, with the guiding surfaces of the protrusions being are situated in the same lateral plane as the inner surfaces of the inner link plates the guidance of engaging chainring teeth and/or engaging sprocket teeth of the same type will be identical for all chain links.

In practice, the guiding surfaces of the protrusions may have a length in the longitudinal direction of the chain of at least 10% and preferably at least 50% of the longitudinal distance between two succeeding inner chain links. In this case, a chainring tooth and/or sprocket tooth engaging between two opposite protrusions of a pair of outer chain links is guided over the majority of its length in the longitudinal direction. In this context the longitudinal direction corresponds to the direction defined by a line between the two axes of the pins of a chain link.

The guiding can be further improved, if the height of the guiding surface extends over at least 10% of the height of the outer link plate in the area of the protrusion. Preferably the guiding surface extends over at least 15% and more preferably over at least 20% of the height of the outer link plates. In this context the height is measured in a plane parallel to the major plane of the link plate and perpendicular to the longitudinal direction. The height of the guiding surface has to be chosen in order to achieve a good compromise between a large guiding surface and a smooth shape of the protrusion as well as a strong longitudinal strength of the chain link plate.

The chain of the drive chain system can be manufactured by the method described hereinafter. The method comprises the step of connecting of a pair of inner link plates and a pair of outer link plates together ad/or to a roller using a pin and repeating this step so as to form an alternating succession of inner chain links and outer chain links. In another step a recess is punched into the outer surface of the outer link plates so as to define a protrusion on the inner surface of the outer link plates. While it may be possible to punch the recession into the outer link place after connecting them to at least one adjacent inner link plate, it is preferred to first form the recession and the protrusion on the outer link plates and then assemble the chain by fixing them to adjacent inner link plates and in particular rollers. As stated above, punching is a very convenient and well controlled method for forming the protrusions on the inner surfaces of the link plates.

The invention also further relates to a bicycle comprising a drive chain system comprising the features described above. The bicycle further comprises at least one chainring, wherein the chainring exhibits a plurality of chainring teeth having generally identical widths in the transverse direction and engaging alternately with inner chain links and outer chain links. The chain described above provides better and more uniform guidance of the chainring teeth between the outer chain link plates and reduces the generation of noise. It is most advantageous, if the bicycle comprises a single chainring. The excellent guidance of the chain allows the chain engage the chainring in a comparable high angle relative to the chainring and therefore allows to combine a single chainring with a rear cassette comprising a high number of sprockets, for example at least 9, preferably at least 11, sprockets.

BRIEF DESCRIPTION OF DRAWINGS

An embodiment of the drive chain system is described below with reference to the attached drawings.

DESCRIPTION OF EMBODIMENTS

Figure 1:
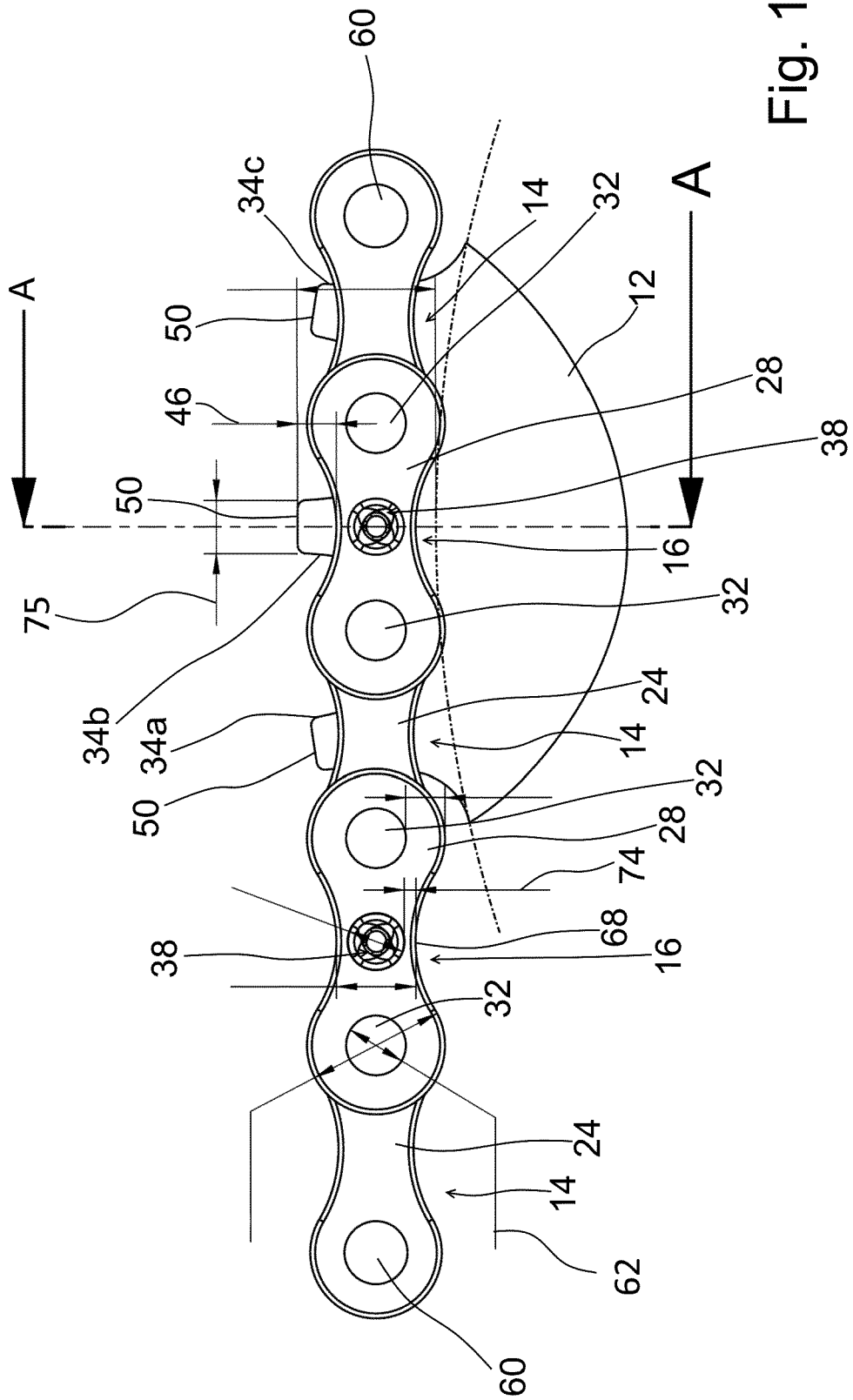
FIG. 1 is a side view of a part of a chainring and an engaging portion of a chain.

FIG. 1 shows a side view of a portion of a drive chain 10 for a bicycle and a part of a chainring 12 engaging the chain.

Figure 5:
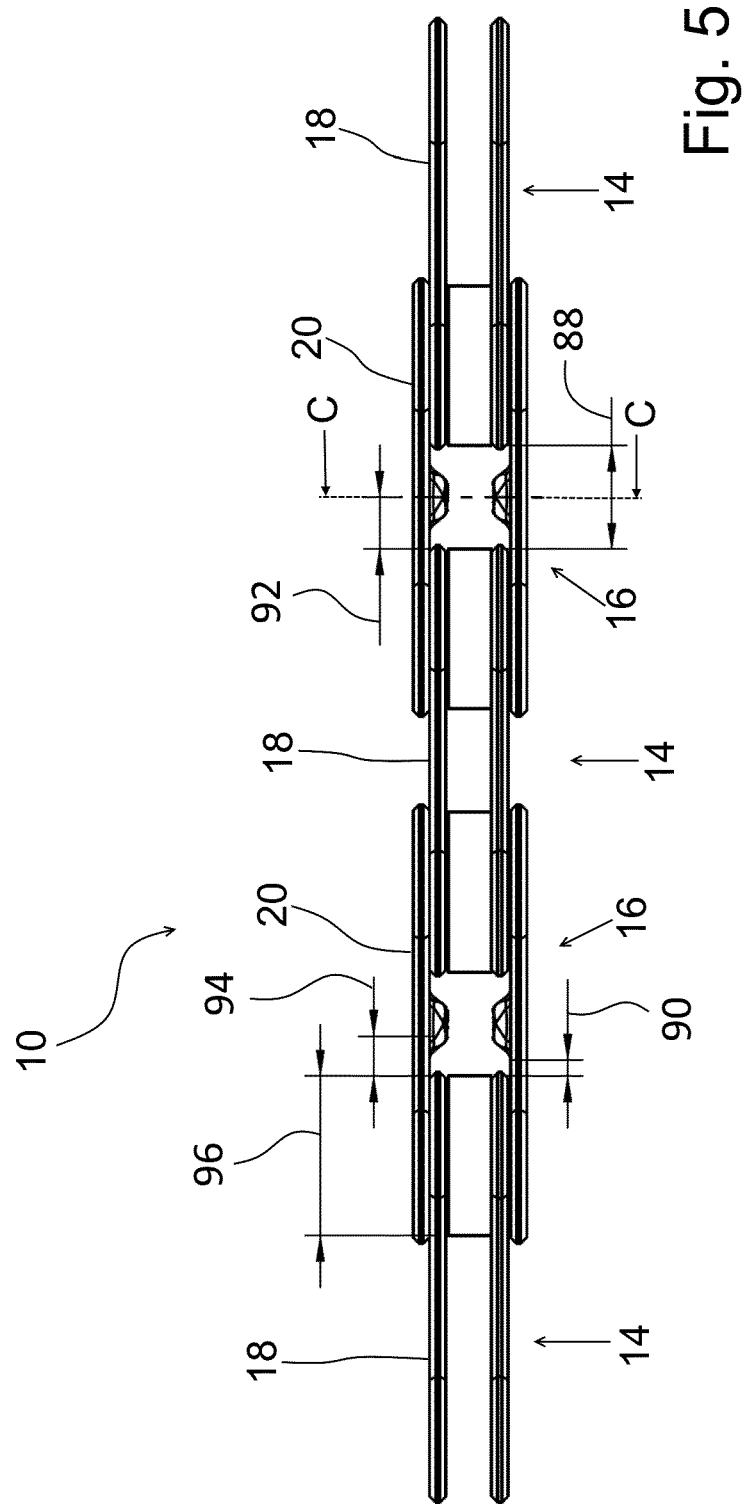
FIG. 5 is a top view of the chain of FIG. 1.

The portion of the chain 10 comprises an alternating succession of inner chain links 14 and outer chain links 16. FIGS. 1 and 5 show inner chain links 14 connected by outer chain links 16. As can be seen in FIG. 5, the inner chain links 14 each have a pair of inner link plates 18 and the outer chain links 14 each have a pair of outer link plates 20. The inner link plates 18 comprise inner surfaces 22, facing each other and outer surfaces 24. The outer link plates 20 also comprise inner surfaces 26 facing each other and outer surfaces 28.

The inner surfaces 22 of a pair of inner link plates 18 can contact the lateral faces of two rollers 30 arranged in the end regions of the inner link plates 18. The inner surfaces 26 of the outer link plates 20 each contact the outer surfaces 24 of two adjacent inner link plates 18. The outer link plates 20, the inner link plates 18 and in particular the roller 30 are connected by means of a pin 32 so that the link plates can rotate around said pin 32.

FIG. 1 shows the part of a chainring 12 with three chainring teeth 34a, 34b, 34c, which engage with the chain 10. FIG. 1 shows that the chainring teeth 34a and 34c engage with inner chain links 14 and chainring tooth 34b engages with an outer chain link 16. Of course, the entire chainring 12 comprises further chainring teeth distributed about its circular periphery which are cut away in the representation of FIG. 1.

Figure 2:
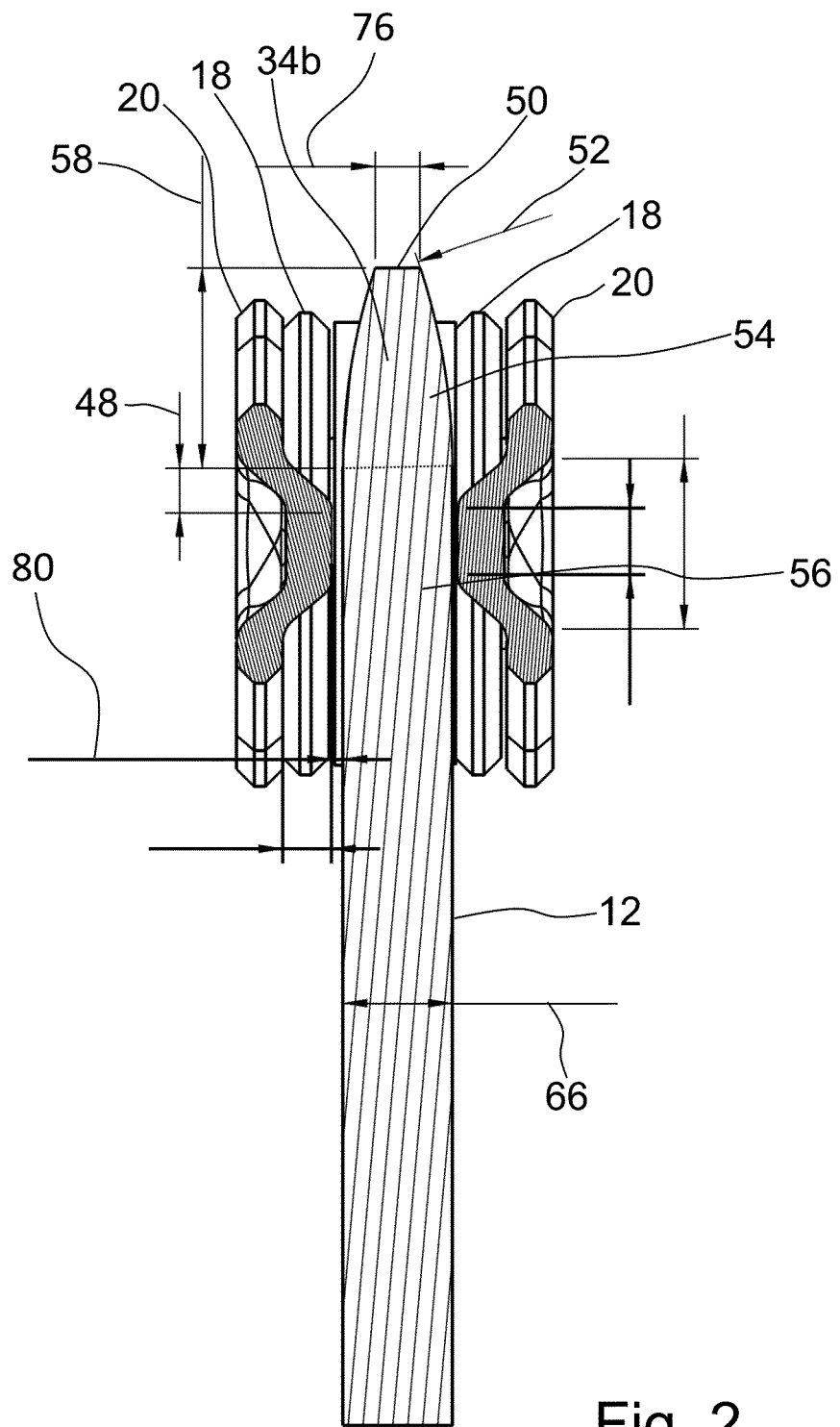
FIG. 2 is a sectional view according to cutting line A-A in FIG. 1.
Figure 3:
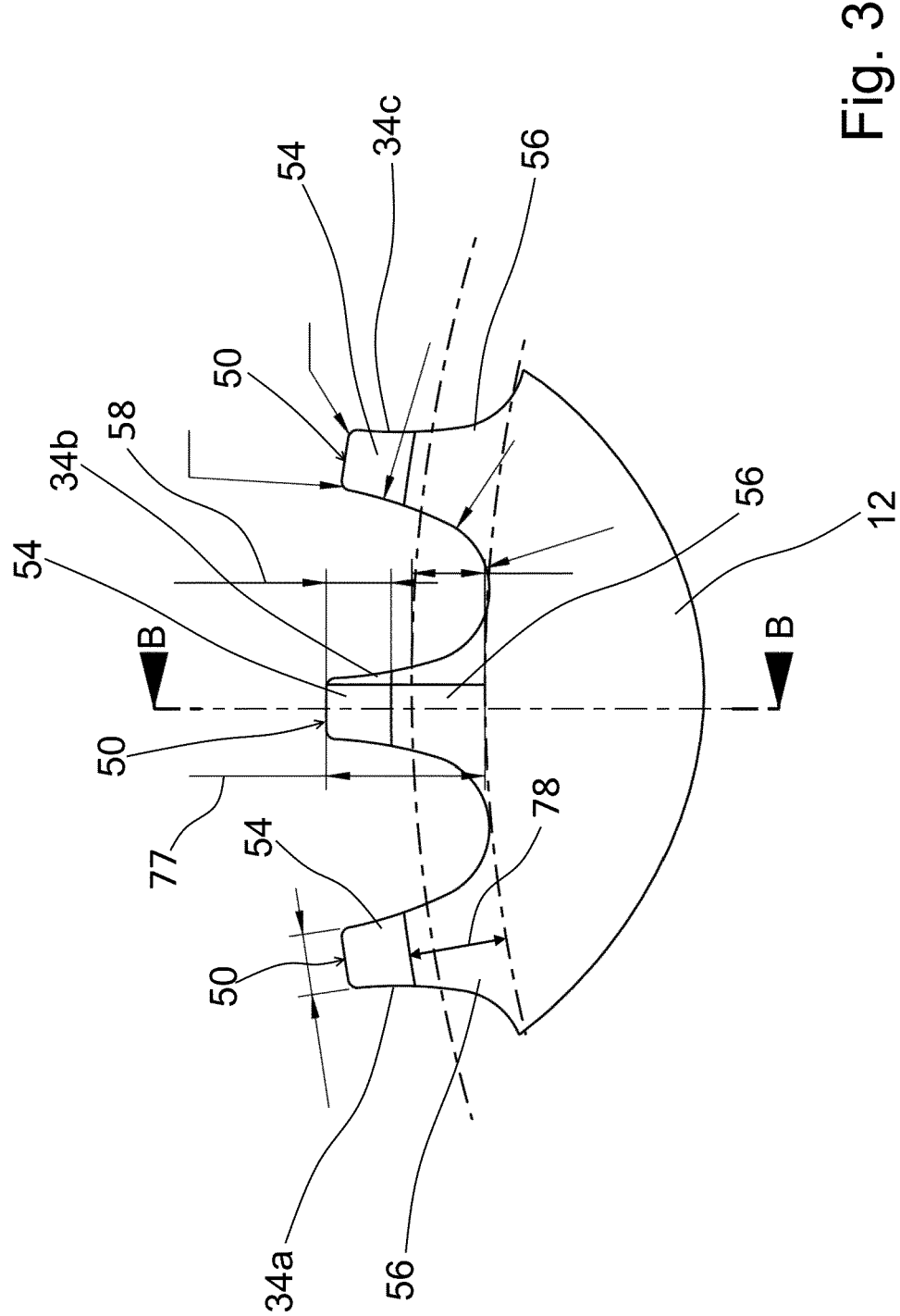
FIG. 3 is a side view of the part of the chainring of FIG. 1.
Figure 4:
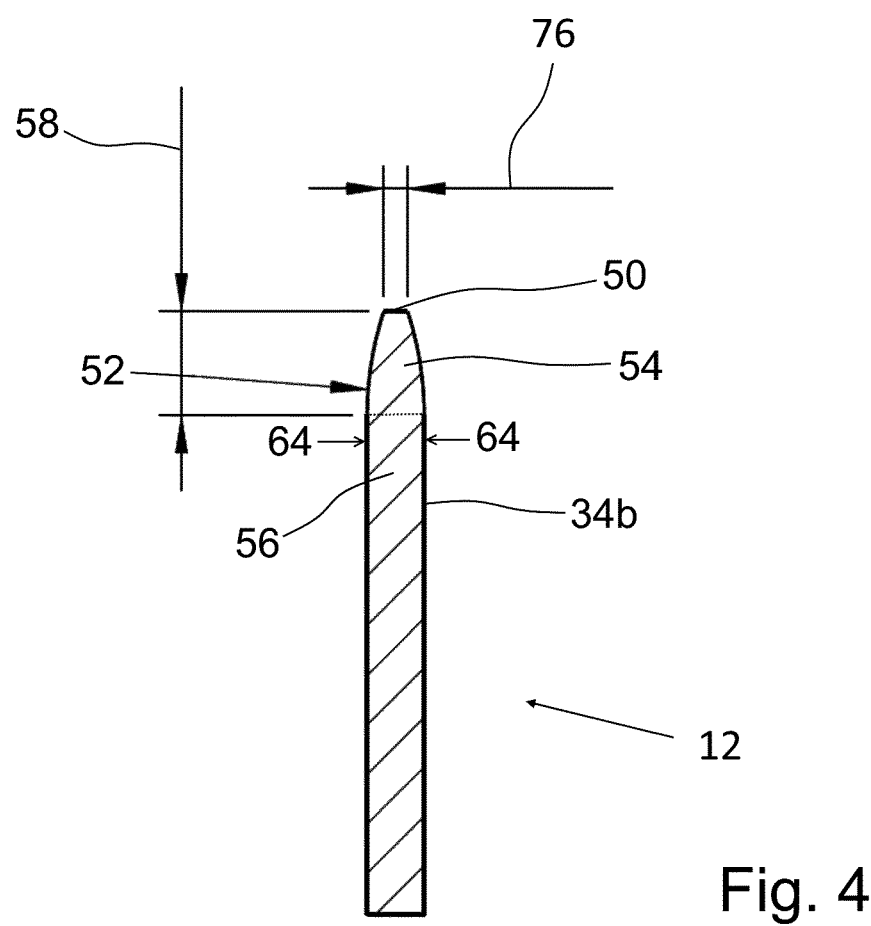
FIG. 4 is a sectional view according to cutting line B-B in FIG. 3.

FIG. 2 shows a detailed sectional view of chainring tooth 34b engaging with a pair of outer link plates 20. The inner surfaces 26 of the opposite outer link plates 20 each comprise a protrusion 36 extending in the lateral (transversal) direction towards the chainring tooth 34b between the outer link plates 20. In the shown embodiment, the thickness of the protrusion 36 measured from the inner surface of the outer link plate 20 where it contacts the outer surface of the inner link plate 18 may be equal to the thickness of the inner link plate 18. Consequently, the distance between two opposite and facing protrusions 36 on opposite outer link plates 20 may be equal to the distance between the opposite inner surfaces 22 of two inner link plates 18.

Figure 6:
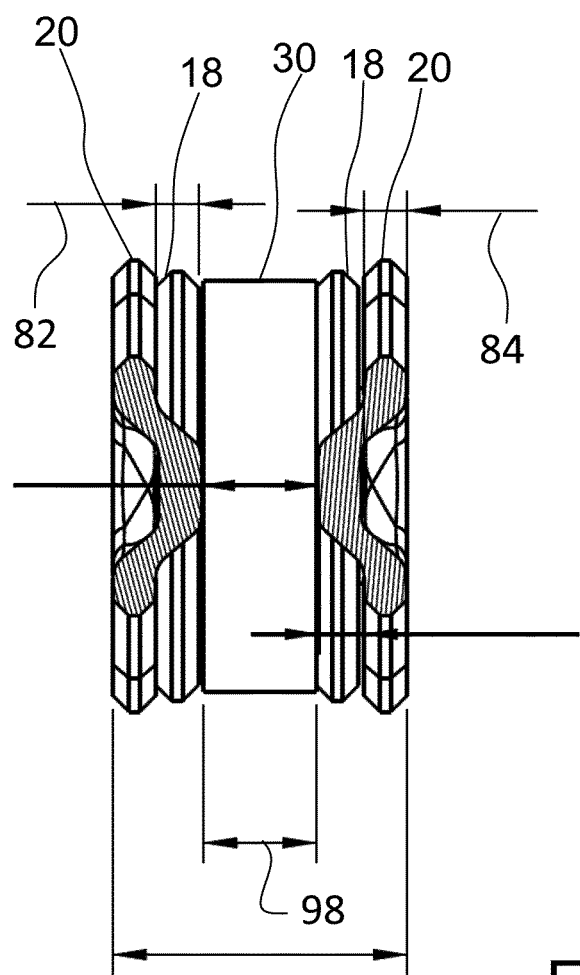
FIG. 6 is a sectional view according to cutting line C-C in FIG. 5.
Figure 7:
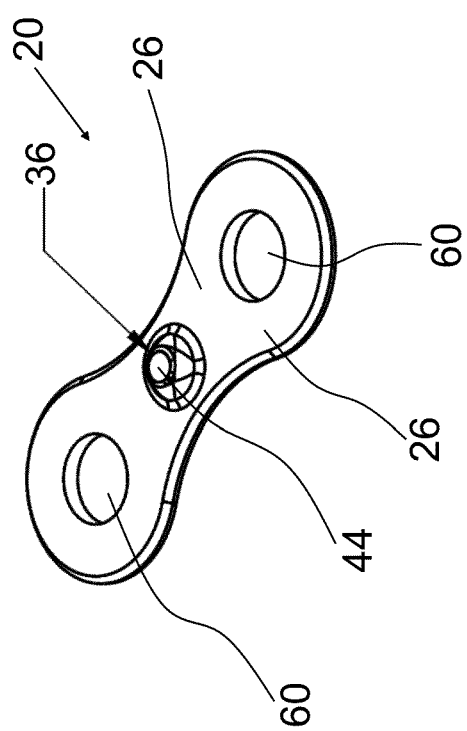
FIG. 7 is a perspective view of an outer link plate of the chain of FIG. 1.
Figure 8:
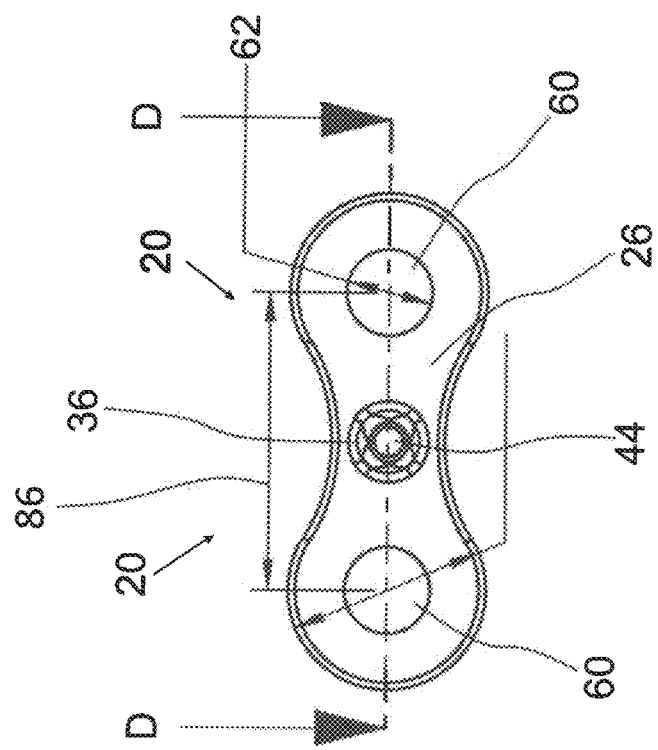
FIG. 8 is a side view of an outer link plate of the chain of FIG. 1.
Figure 9:
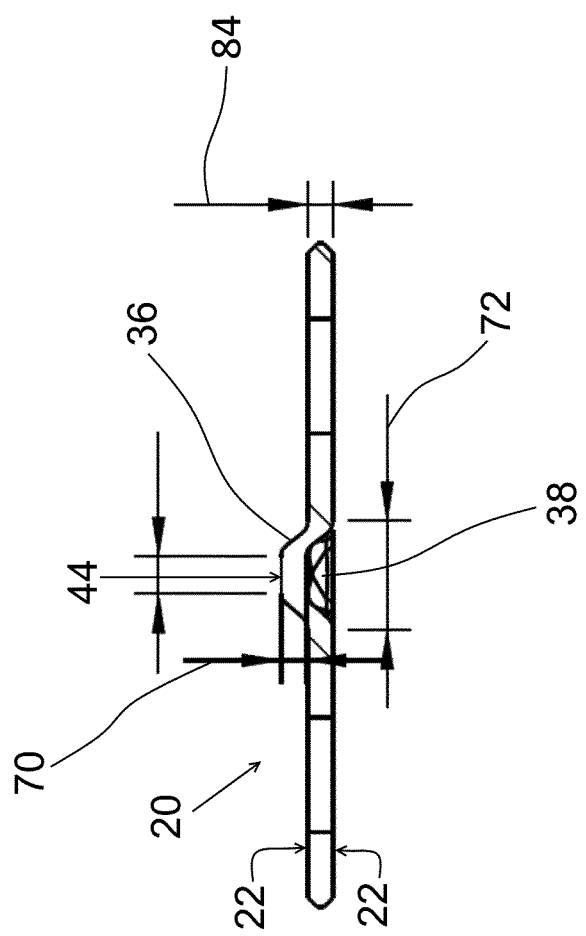
FIG. 9 is a sectional view according to cutting line D-D in FIG. 8.

The protrusions 36 extend in longitudinal direction of the chain 10 in the area between the two inner link plates 18 that are located adjacent the respective outer link plate 20 and connected to it by means of pins 32. The outer surface 28 of the outer link plates 20 can comprise a trough-like recess 38 (also see FIG. 6) corresponding to the protrusion 36. The thickness of the outer link plates 20 can therefore be generally constant. The trough-like recess 38 and/or the corresponding protrusion 36 may extend over the major part of the height of the outer link plate 20.

The recess 38 can be formed by punching and may show no sharp edges lines. The transition between neighboring areas of the trough-like recess 36, such as the bottom 40 of the recess 38 and the side walls 42 of the recess 38 can be realized by radiuses. Also, the transition from the side walls 42 to the outer surface 28 of the outer link plate 20 adjacent to the recess 38 may have a radius.

The protrusion 36 may have a flat or rounded guiding surface 44 facing the chainring tooth 34b engaging the outer chain link 16. The guiding surface 44 can be generally located in the center of the protrusion 36 and may extend over about 25% of the height of the protrusion 36 and/or 25% of the length of the protrusion 36 in the longitudinal direction, which corresponds to the line connecting the axes of the two pins 32 connected to each chain link 14, 16. The shape of the guiding surface may vary from the shape shown in the drawings depending on the shape of the punch and the die used in the punching process.

The chainring teeth 34a, 34b and 34c can taper laterally towards their respective tip 50, as shown in the example. The chainring teeth 34a, 34b, 34c can comprise a lateral curvature 52. The lateral curvature can have a convex radius of at least 8 mm, particularly at least 10 mm, and/or maximum 14 mm, particularly maximum 12 mm.

It is possible that the chainring teeth 34a, 34b, 34c taper laterally in a section 54 between their respective tip 50 and a section 56 of the respective chainring tooth 34a, 34b, 34c with parallel lateral surfaces 64. In this case, the chainring teeth 34a, 34b, 34c can taper towards their tips 50 in a limited region near the tips 50 and therefore provide a fast increase in lateral guidance of the chain 10 when the tapering section 54 passes the space between the protrusions 36.

As shown in the embodiment, the distance 66 between the lateral surfaces 64 of the chainring teeth 34 can be at least 1.9 mm and/or maximum 2 mm in the section 56 of the respective chainring tooth 34 with parallel lateral surfaces.

The drive chain system can be configured in such manner that the protrusions 36 engage a chainring tooth 34 in its section with parallel lateral surfaces, when the chain is fully engaged to this chainring tooth 34. FIG. 1 and FIG. 2 show an outer chain link 16 link fully engaged to the chainring tooth 34b.

The section 56 with parallel lateral surfaces 64 may extend over a distance 48 of at least 0.5 mm, preferably at least 0.8 mm, towards the tip 50 of the chainring tooth 34b from the point of contact between the protrusion 36 and the chainring tooth 34b nearest to the tip 50 of the chainring tooth 34b, when the chain 10 is fully engaged to this chainring tooth 34b, as shown in FIG. 2.

The distance 70 the protrusion 36 protrudes from the outer link plate 20 towards a chainring tooth 34b can be at least 70%, preferably at least 90%, and/or maximum 130%, preferably maximum 110% of the distance the parallel lateral surfaces 64 extend towards the tip 50 of the chainring tooth 34b from the point of contact between the protrusion 36 and the chainring tooth 34b nearest to the tip 50 of the chainring tooth 34b, when the chain 10 is fully engaged to this chainring tooth 34b.

The tips 50 of the chainring teeth 34 can protrude from the chain links 14, 16 when the respective chain link 14, 16 is fully engaged with the respective chainring tooth 34a, 34b, 34c as shown in the embodiment.

The tips 50 of the chainring teeth 34 can be of a plateau-like shape with a length 75 of the plateau of at least 2.8 mm, in particular at least 3 mm, and/or maximum 3.5 mm, in particular maximum 3.2 mm.

The tips 50 of the chainring teeth 34 can be of a plateau-like shape with a width 76 of the plateau of at least 0.8 mm, in particular at least 0.9 mm, and/or maximum 1.2 mm, in particular maximum 1.1 mm.

The height 77 of the chainring teeth 34 can be at least 7.5 mm, in particular at least 8.5 mm, and/or maximum 9.5 mm, in particular maximum 8.5 mm.

The height 58 of the tapering section 54 can be at least 2.5 mm, in particular at least 3 mm, and/or maximum 4.5 mm, in particular maximum 4 mm.

The height 78 of the section 56 with parallel lateral surfaces 64 can be at least 3 mm, in particular at least 3.5 mm, and/or maximum 5 mm, in particular maximum 4.5 mm.

The clearance 80 between a protrusion 36 of an outer chain link 16 and one of the parallel lateral surfaces 64 of a chainring tooth 34b can be at least 0.1 mm, in particular at least 0.13 mm, and/or maximum 2.0 mm, in particular maximum 0.17 mm, when the opposite lateral surface 64 of the same chainring tooth 34b is in contact with the opposite protrusion 36 of the same outer chain link 16 and the outer chain link 16 is fully engaged with the chainring tooth 34b.

The circumference and/or diameter 72 of the protrusion 36 can be at least 60% and/or maximum 140% the circumference and/or diameter 62 of the eyes 60 of the outer link plate 20.

Preferably, the circumference and/or diameter 72 of the protrusion 36 is at least 90% and/or maximum 110% of the circumference and/or diameter 62 of the eyes 60 of the outer link plate 20.

In the shown embodiment, the diameter 62 of the eyes 60 of the outer chain link 20 may be at least 3 mm, preferably at least 3.4 mm, and/or maximum 4 mm, preferably maximum 3.6 mm.

The diameter 72 of the protrusion 36 may be at least 3.3 mm, preferably at least 3.5 mm, and/or maximum 3.9 mm, preferably maximum 3.7 mm. This sizes lead to a good guidance.

The protrusions 36 can define a generally flat or rounded inner guiding surface 44. The area of the inner guiding surface 44 may be at least 0.9 mm$^2$, preferably at least 1.1 mm$^2$, and/or maximum 1.5 mm$^2$, preferably maximum 1.3 mm$^2$.

As shown in the embodiment, the smallest distance 74 between the protrusion 36 and the edge 68 of the outer link plate 20 can be at least 0.4 mm, preferably at least 0.6 mm, and/or maximum 0.8 mm, preferably maximum 0.7 mm.

The width 82 of the inner link plates 18 can be at least 0.7 mm, in particular at least 0.75 mm, and/or maximum 1 mm, in particular maximum 0.95 mm.

The width 84 of the outer link plates 20 can be at least 0.7 mm, in particular at least 0.75 mm, and/or maximum 1 mm, in particular maximum 0.95 mm.

The distance 86 between the centers of the eyes 60 of the outer link plates 20 can be at least 11.7 mm, in particular at least 12.2 mm, and/or maximum 13.7 mm, in particular maximum 13.2 mm. Preferably the distance 86 between the centers of the eyes 60 of the outer link plates 20 is 12.7 mm.

The distance 88 between the two rollers 30 of a chain link 14, 16 can be at least 4 mm, in particular at least 4.5 mm, and/or maximum 6 mm, in particular maximum 5.5 mm.

As shown in the embodiment, the smallest distance 90 between the protrusion 36 and a roller 30 can be at least 0.2 mm, preferably at least 0.75 mm, and/or maximum 0.9 mm, preferably maximum 0.85 mm.

As shown in the embodiment, the smallest distance 92 between the center of the protrusion 36 and an inner link plate 20 can be at least 2.1 mm, preferably at least 2.2 mm, and/or maximum 2.9 mm, preferably maximum 2.7 mm.

As shown in the embodiment, the smallest distance 94 between the guiding surface 44 and an inner link plate 20 can be at least 1.6 mm, preferably at least 1.8 mm, and/or maximum 2.4 mm, preferably maximum 2.2 mm.

As shown in the embodiment, the diameter 96 of the rollers 30 can be at least 7 mm, preferably at least 7.5 mm, and/or maximum 8.5 mm, preferably maximum 8 mm.

As shown in the embodiment, the width of the rollers 30 can be at least 1.7 mm, preferably at least 1.9 mm, and/or maximum 2.5 mm, preferably maximum 2.3 mm.

The cassette 100 comprises sprocket teeth of different tooth types, the sprocket teeth of at least one sprocket tooth type having a tip laterally offset from the centerplane 102 of the respective sprocket tooth.

Figure 10:
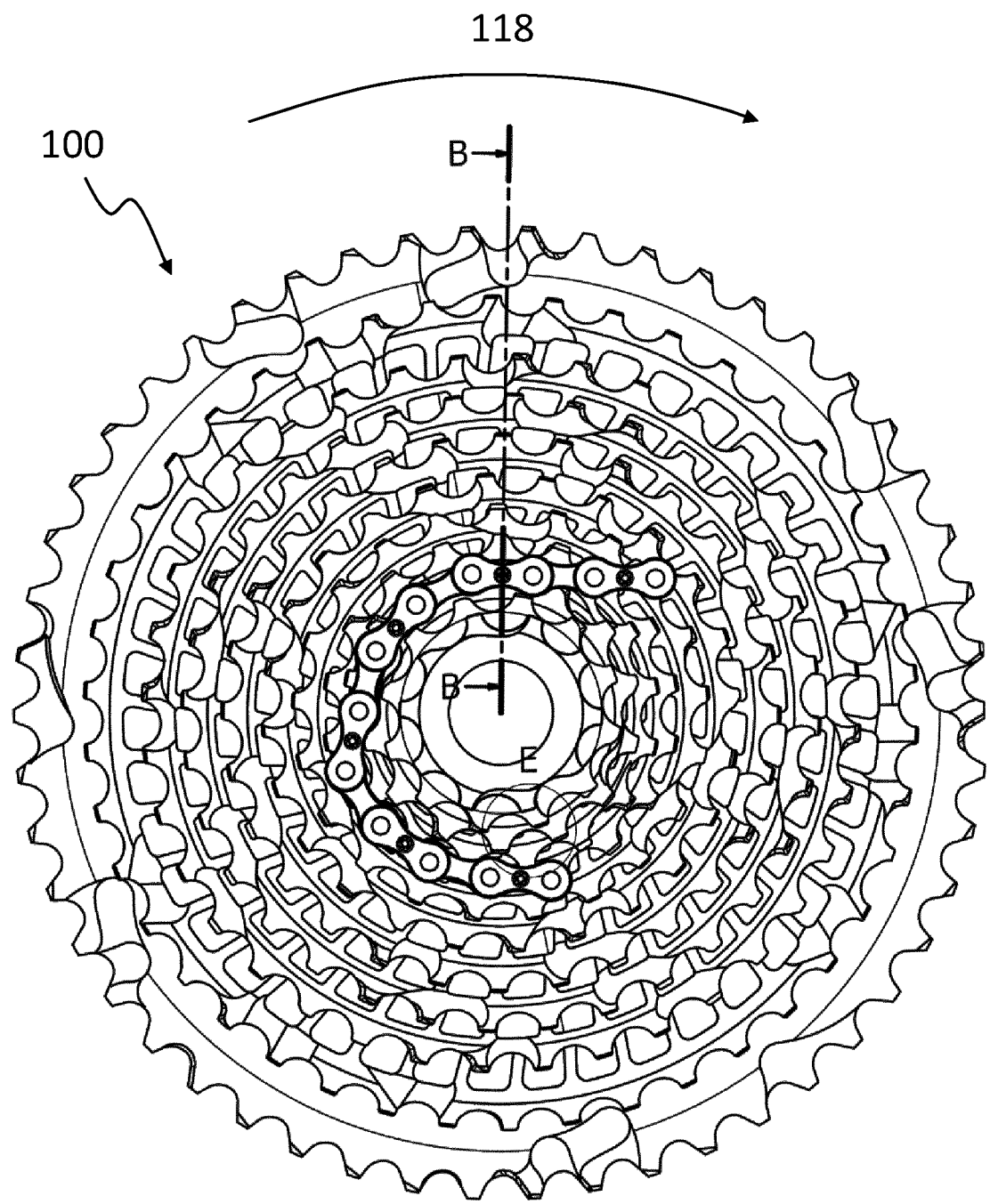
FIG. 10 is a side view of a rear cassette with a portion of the chain of FIG. 1 up.
Figure 11:
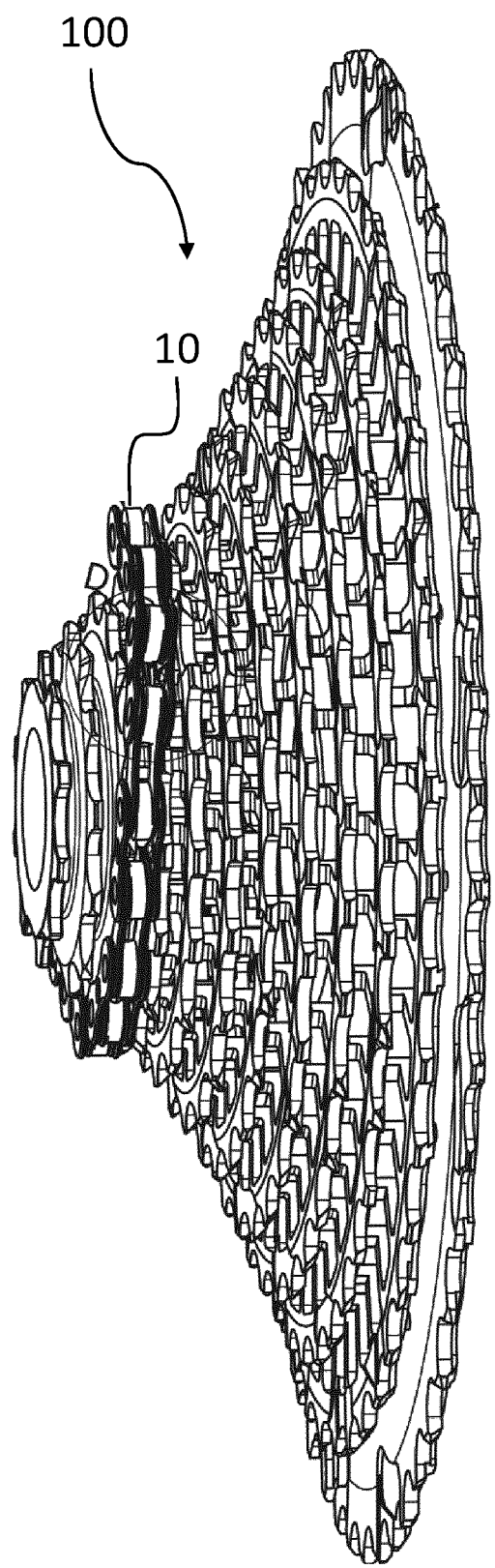
FIG. 11 is a top view of a rear cassette of FIG. 10.

At least one sprocket tooth type can be an upshifting sprocket tooth type supporting shifting to a larger sprocket, the upshifting sprocket teeth 104 of this upshifting sprocket tooth type having a tip 106 laterally offset towards a smaller sprocket. Such an upshifting operation is shown in FIGS. 10 to 12.

Figure 12:
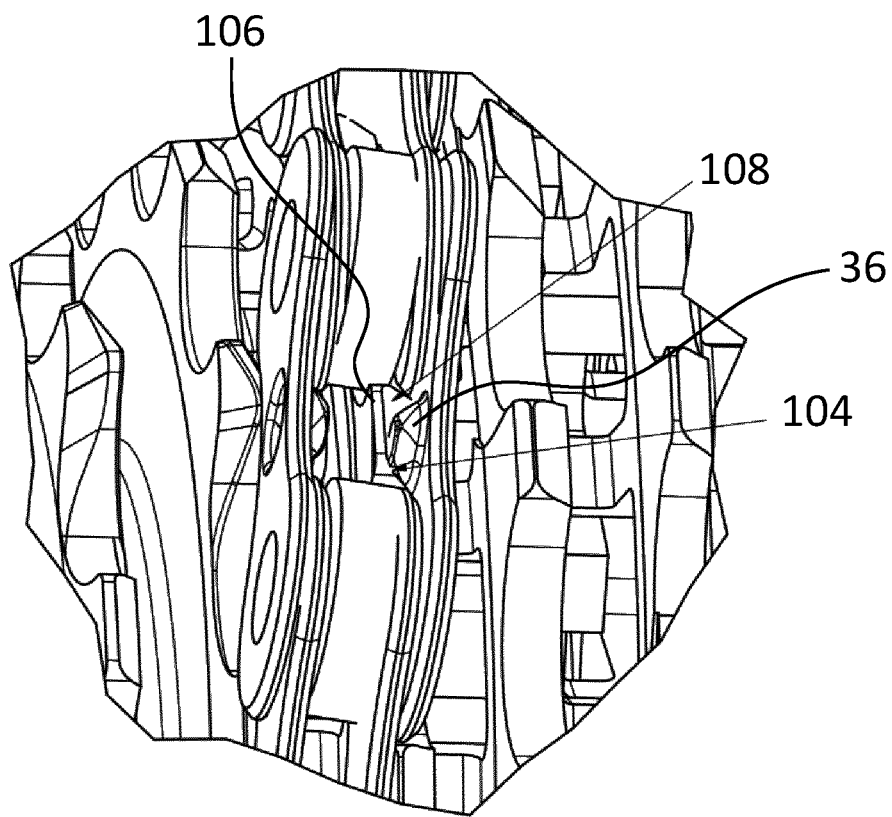
FIG. 12 is an enlarged view of the Region D in FIG. 11.
Figure 13:
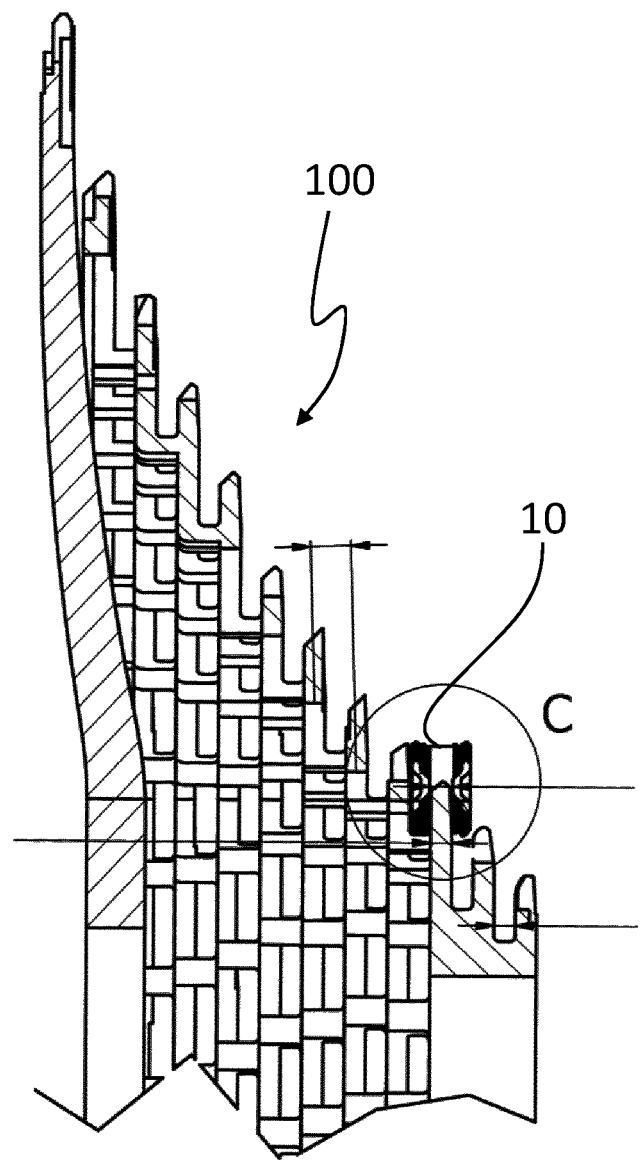
FIG. 13 is a sectional view according to cutting line B-B in FIG. 12.

As one can see especially in FIG. 12, with these upshifting sprocket teeth, the tip 106 offset towards the smaller sprocket comes into contact more easily with a chain link moved from the rear derailleur to the larger sprocket during the shifting process. In combination with the protrusions 36 on the outer link plates 20, there is also the advantage that the laterally offset tip 106 can engage the protrusion 36 after initial contact with the outer chain link 16 to move the chain 10 further in lateral towards the larger sprocket.

Figure 14:
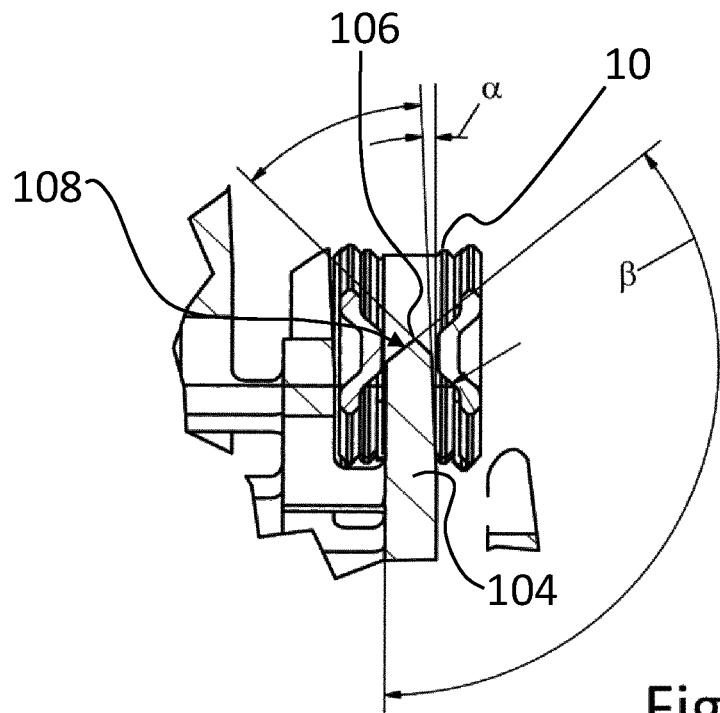
FIG. 14 is an enlarged view of the Region C in FIG. 13.
Figure 15:
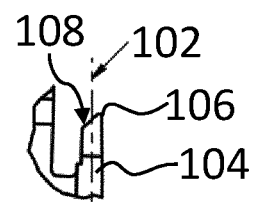
FIG. 15 is a sectional view of an upshifting sprocket tooth.

The cassette 100 particularly comprises upshifting sprocket teeth 104 of at least two different upshifting sprocket tooth types supporting shifting to a larger sprocket, wherein the distance by which the tips 106 of the at least two upshifting sprocket tooth types are offset towards the smaller sprocket being different between the at least two upshifting sprocket tooth types. Examples for different upshifting sprocket teeth 104 can be found especially comparing the different upshifting sprocket tooth types shown in FIGS. 14 and 15.

The upshifting sprocket teeth 104 of at least one upshifting sprocket tooth type may have on their side facing a smaller sprocket a taper of the tooth towards the tip 106 at an angle α. Such a taper is shown in especially in FIG. 14.

The teeth of at least one upshifting sprocket tooth type may have an inclined surface 108 at an angle β between their side facing a larger sprocket and the tip (106). Such an inclined surface 108 is shown especially in FIGS. 12, 14 and 15.

Figure 16:
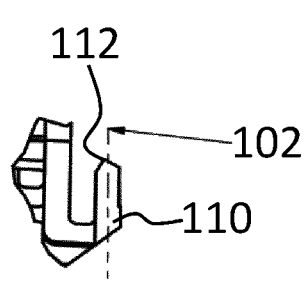
FIG. 16 is a sectional view of a downshifting sprocket tooth.

At least one sprocket tooth type may be a downshifting sprocket tooth type supporting shifting to a smaller sprocket, the downshifting sprocket teeth 110 of this tooth type having a tip 112 laterally offset towards a larger sprocket. This is shown especially in FIG. 16.

The downshifting sprocket teeth 110 of the downshifting sprocket tooth type can have a facet 114 on their side facing a smaller sprocket. The facet 114 can extend between the tip 112 and the leading tooth flank. Such a facet 114 may, in particular during the shifting operation to a smaller sprocket, enable the downshifting sprocket tooth 110 to slide in a controlled manner beside a chain link 14, 16 and guide the chain link 14, 16 in direction of its lateral target position on the smaller sprocket. This is shown best in FIG. 20.

Figure 20:
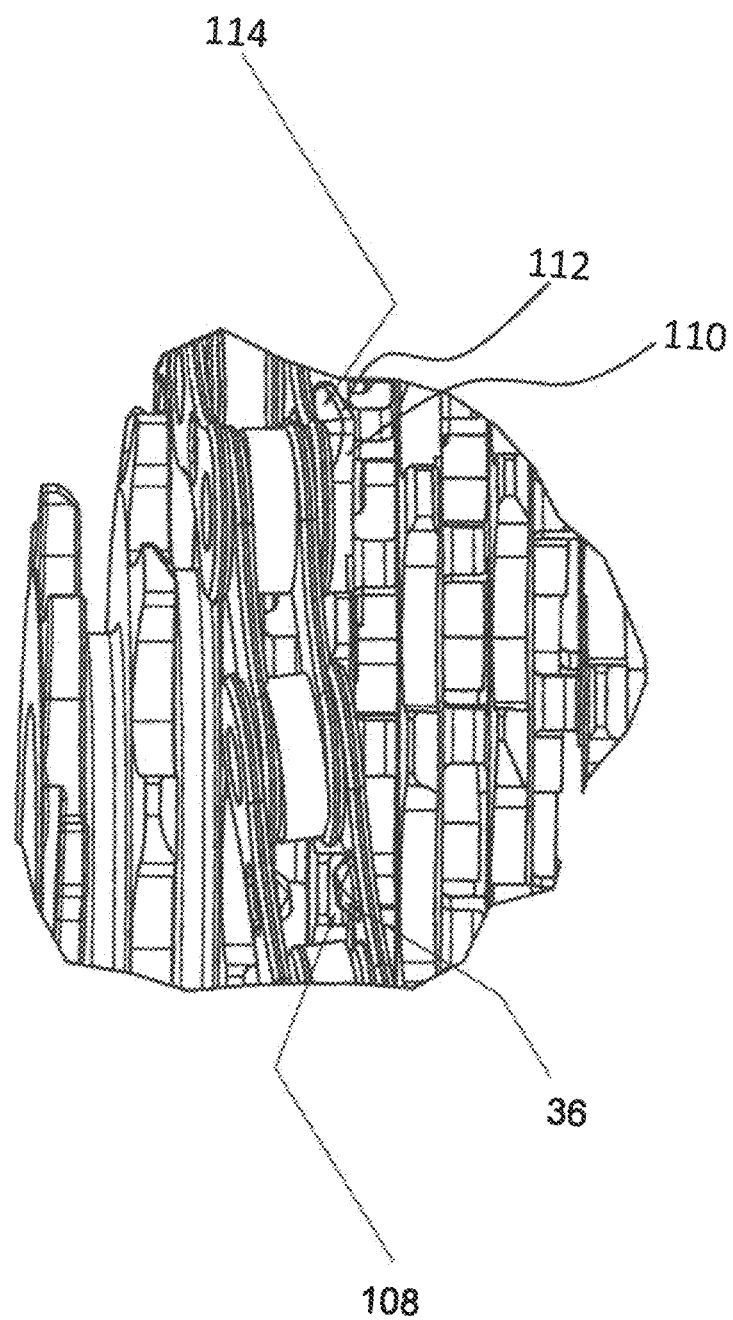
FIG. 20 is an enlarged view of the Region A in FIG. 19.

As one can see in FIG. 20, there can also be a beneficial effect in combination with the protrusions 36 and the inclined surfaces 108 of the upshifting sprocket teeth 104 during the downshifting operation. The inclined surface 108 can engage with a protrusion 36 and support a chain link lateral position located between the sprockets involved in the downshifting operation.

Figure 17:
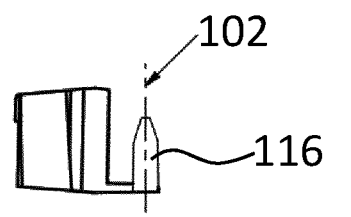
FIG. 17 is a sectional view of a neutral sprocket tooth.
Figure 18:
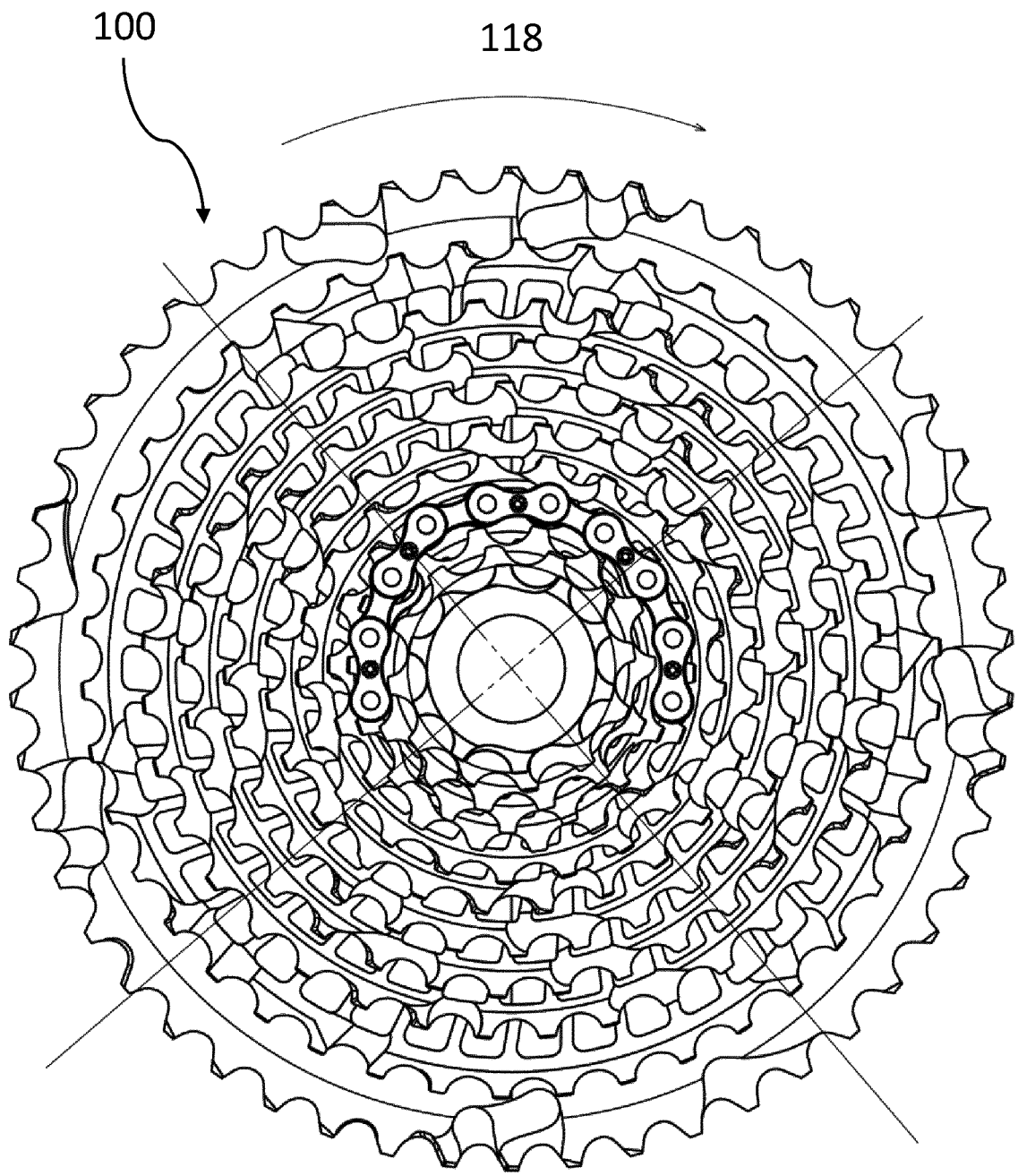
FIG. 18 is a side view of a rear cassette with a portion of the chain of FIG. 1 down.
Figure 19:
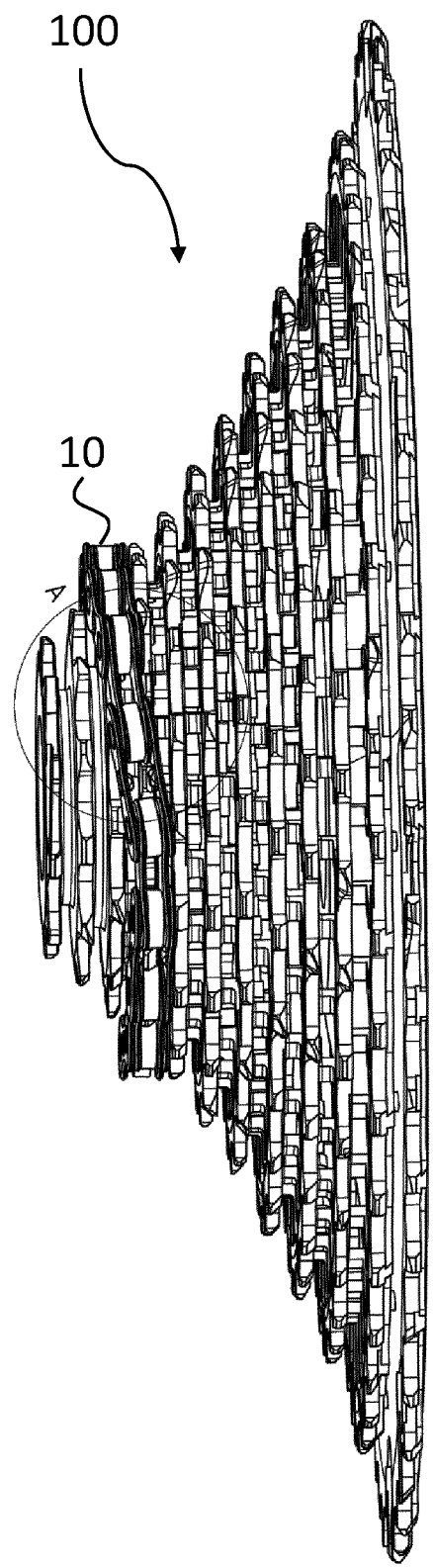
FIG. 19 is a top view of a rear cassette of FIG. 18.

As shown in FIG. 17, at least one sprocket tooth type can be a neutral sprocket tooth type with neutral sprocket teeth 116 having no laterally offset tips.

REFERENCE NUMERALS

10 chain
12 chainring
14 inner chain link
16 outer chain link
18 inner link plate
20 outer link plate
22 inner surface of inner link plate
24 outer surface of inner link plate
26 inner surface of outer link plate
28 outer surface of outer link plate
30 roller
32 pin
34a, 34b, 34c chainring tooth
36 protrusion
38 recess
40 bottom
42 side wall
44 guiding surface
46 distance
48 distance
50 tip
52 curvature
54 tapering section
58 height tapering section
60 eye
62 diameter
64 lateral surface
66 distance
68 edge
70 distance
72 diameter
74 distance
75 length tip
76 width tip
77 height chainring teeth
78 height
80 clearance
82 width inner link plate
84 width outer link plate
86 distance
88 distance
90 distance
92 distance
94 distance
96 diameter
98 width
100 cassette
102 centerplane
104 upshifting sprocket tooth
106 tip
108 inclined surface
110 downshifting sprocket tooth
112 tip
114 facet
116 neutral sprocket tooth
118 rotation direction while driving
α angle (taper)
β angle (inclined surface)

The invention claimed is:

1. A drive chain system comprising a chain with an alternating succession of inner chain links and outer chain links, each inner chain link having a pair of inner link plates and each outer chain link having a pair of two outer link plates contacting the inner linkplates of adjacent inner chain links, wherein a pin connects two outer link plates and two inner link plates, wherein the inner surfaces of a pair of opposite outer link plates comprise protrusions in the area between the adjacent inner link plates, wherein the system comprises a rear cassette with a multitude of sprockets with a plurality of sprocket teeth, wherein the cassette comprises sprocket teeth of different sprocket tooth types, the sprocket teeth of at least one sprocket tooth type having a tip laterally offset from the respective centerplane, wherein the cassette comprises upshifting sprocket teeth of at least two different upshifting sprocket tooth types supporting shifting to a larger sprocket, wherein the distance by which the tip of the at least two upshifting sprocket tooth types are offset towards a smaller sprocket being different between the at least two upshifting sprocket tooth types, wherein the teeth of at least one upshifting sprocket tooth type having an inclined surface between their side facing a larger sprocket and the tip, the inclined surface is at an angle ($\beta$) of at least 120° and maximum 140° to a plane parallel to the centerplane of the respective tooth.

2. The system according to claim 1, wherein the upshifting sprocket teeth of the at least one upshifting sprocket tooth type having on their side facing a smaller sprocket a taper of the tooth towards the tip.

3. The system according to claim 2, wherein the taper is at an angle ($\alpha$) of at least 5°, and/or maximum 45°, to a plane parallel to the centerplane of the respective upshifting sprocket tooth.

4. The system according to claim 1, wherein the at least one sprocket tooth type is a downshifting sprocket tooth type supporting shifting to a smaller sprocket, the downshifting sprocket teeth of this tooth type having a tip laterally offset towards a larger sprocket.

5. The system according to claim 4, wherein the downshifting sprocket teeth of the downshifting sprocket tooth type have a facet on a side facing a smaller sprocket, wherein the facet extends between the tip and the leading tooth flank.

6. The system according to claim 1, wherein the diameter of the protrusion is at least 3.3 mm and/or maximum 3.9 mm.

7. The system according to claim 1, wherein the protrusions define a generally flat or rounded inner guiding surface.

8. The system according to claim 7, wherein the area of the inner guiding surface is at least 0.9 mm$^2$, and/or maximum 1.5 mm$^2$.

9. The system according to claim 1, wherein the smallest distance between the protrusion and the edge of the outer link plate is at least 0.4 mm and/or maximum 0.8 mm.

10. The system according to claim 7, wherein the smallest distance between the guiding surface and an inner link plate is at least 1.6 mm, and/or maximum 2.4 mm.

11. A bicycle with a drive chain system according to claim 1, wherein the bicycle comprises only a single chainring.

12. The system according to claim 3, wherein the taper is at an angle of at least 10° and/or maximum 12° to a plane parallel to the centerplane of the respective upshifting sprocket tooth.

13. The system according to claim 6, wherein the diameter of the protrusion is at least 3.5 mm and/or maximum 3.7 mm.

14. The system according to claim 8, wherein the area of the inner guiding surface is at least 1.1 mm$^2$ and/or maximum 1.3 mm$^2$.

15. The system according to claim 9, wherein the smallest distance between the protrusion and the edge of the outer link plate is at least 0.6 mm and/or maximum 0.7 mm.

\* \* \* \* \*